United States Patent
Yasui

(10) Patent No.: US 10,640,647 B2
(45) Date of Patent: May 5, 2020

(54) POLYAMIDE RESIN COMPOSITION

(71) Applicant: UBE INDUSTRIES, LTD., Ube-shi, Yamaguchi (JP)

(72) Inventor: Tetsuya Yasui, Ube (JP)

(73) Assignee: UBE INDUSTRIES, LTD., Ube-Shi (JP)

( * ) Notice: Subject to any disclaimer, the term of this patent is extended or adjusted under 35 U.S.C. 154(b) by 35 days.

(21) Appl. No.: 16/070,136

(22) PCT Filed: Jan. 31, 2017

(86) PCT No.: PCT/JP2017/003302
§ 371 (c)(1),
(2) Date: Jul. 13, 2018

(87) PCT Pub. No.: WO2017/135215
PCT Pub. Date: Aug. 10, 2017

(65) Prior Publication Data
US 2019/0023898 A1    Jan. 24, 2019

(30) Foreign Application Priority Data

Feb. 4, 2016 (JP) .................................. 2016-019682

(51) Int. Cl.
| | | |
|---|---|---|
| *C08L 77/06* | (2006.01) | |
| *C08K 5/13* | (2006.01) | |
| *C08L 77/02* | (2006.01) | |
| *C08K 3/16* | (2006.01) | |
| *B29C 49/00* | (2006.01) | |
| *C08K 5/37* | (2006.01) | |

(52) U.S. Cl.
CPC .............. *C08L 77/06* (2013.01); *C08K 3/16* (2013.01); *C08K 5/13* (2013.01); *C08L 77/02* (2013.01); *B29C 49/0005* (2013.01); *C08K 5/37* (2013.01); *C08L 2205/025* (2013.01)

(58) Field of Classification Search
CPC ..... C08L 77/06; C08L 2205/025; C08K 3/16; C08K 5/13
See application file for complete search history.

(56) References Cited

U.S. PATENT DOCUMENTS

| | | | |
|---|---|---|---|
| 4,714,718 A | 12/1987 | Horn et al. | |
| 4,849,476 A | 7/1989 | Mashita et al. | |
| 6,140,459 A * | 10/2000 | Leboeuf | C08G 69/265 528/310 |
| 2002/0028889 A1* | 3/2002 | Nakamura | C08L 77/00 525/432 |
| 2004/0030023 A1 | 2/2004 | Buhler et al. | |
| 2004/0059056 A1 | 3/2004 | Montanari et al. | |
| 2007/0155877 A1 | 7/2007 | Shinohara | |
| 2013/0053500 A1 | 2/2013 | Gavenonis et al. | |
| 2014/0011951 A1* | 1/2014 | Martens | C09K 8/685 524/607 |
| 2014/0371394 A1* | 12/2014 | Kito | C08L 23/10 525/184 |
| 2017/0028689 A1 | 2/2017 | Verpoest et al. | |

FOREIGN PATENT DOCUMENTS

| | | |
|---|---|---|
| CN | 102719047 A | 10/2012 |
| EP | 1 741 754 A1 | 1/2007 |
| GB | 1368054 A | 9/1974 |
| JP | 61-95066 A | 5/1986 |
| JP | 62-275157 A | 11/1987 |
| JP | 2002-534547 A | 10/2002 |
| JP | 2003-529659 A | 10/2003 |
| JP | 2007-126591 A | 5/2007 |
| JP | 2008-239842 A | 10/2008 |
| JP | 2009-517500 A | 4/2009 |
| JP | 2011-42782 A | 3/2011 |
| JP | 2014-15592 A | 1/2014 |
| JP | 2014-534274 A | 12/2014 |
| WO | WO 00/40649 A1 | 7/2000 |
| WO | WO 2015/098470 A | 7/2015 |

OTHER PUBLICATIONS

International Search Report for PCT/JP2017/003302 (PCT/ISA/210) dated May 16, 2017.
Extended European Search Report dated Aug. 26, 2019, for corresponding European Application No. 17747371.7.

* cited by examiner

*Primary Examiner* — Robert D Harlan
(74) *Attorney, Agent, or Firm* — Birch, Stewart, Kolasch & Birch, LLP

(57) ABSTRACT

Provided is a polyamide resin composition which comprises a polyamide resin (A) and an impact-resistant material (B), wherein the polyamide resin (A) comprises an aliphatic copolyamide (A-1) comprising three or more types of monomers and an aliphatic polyamide (A-2), wherein the content of the aliphatic copolyamide (A-1) in the polyamide resin composition is 1% by mass to 30% by mass.

14 Claims, No Drawings

POLYAMIDE RESIN COMPOSITION

FIELD OF THE INVENTION

The present invention relates to a polyamide resin composition.

BACKGROUND ART

A polyamide resin has excellent mechanical properties and excellent heat resistance as well as excellent chemical resistance, and therefore has been developed as engineering plastics in a variety of applications and used by way of various molding methods. Especially, the use of the polyamide resin as a blow molded article produced by blow molding is expanding.

In connection with the above, a blow molding material comprising a polyamide resin composition which comprises two types of aliphatic polyamide resins, an aromatic polyamide resin, and an impact-resistant material has been proposed, and has been reported to have excellent blow moldability and impact resistance (see, for example, patent document 1). Further, a thermoplastic composition which is capable of being blow molded, and which comprises a thermoplastic resin, a viscosity modifier, a nitrogen-containing hindered phenolic antioxidant, a multifunctional ester group-containing hindered phenolic antioxidant, and a mixture of a copper salt and a potassium halide has been proposed, and has been reported to have excellent weldability (see, for example, patent document 2).

PRIOR ART REFERENCES

Patent Documents

Patent document 1: Japanese Unexamined Patent Publication No. 2007-126591

Patent document 2: Japanese Patent Application prior-to-examination Publication (kohyo) No. 2002-534547

SUMMARY OF THE INVENTION

Problems to be Solved by the Invention

The prior art polyamide resin composition is likely to be unable to achieve both excellent mechanical physical properties and excellent heat welding properties in addition to blow moldability.

A task of the present invention is to provide a polyamide resin composition which can exhibit a melt viscosity, mechanical physical properties, and heat welding properties such that excellent blow moldability can be achieved.

Means for Solving the Problems

Specific means for solving the above-mentioned problems is as follows:

A polyamide resin composition which comprises a polyamide resin (A) and an impact-resistant material (B), wherein the polyamide resin (A) comprises an aliphatic copolyamide (A-1) comprising three or more types of monomers and an aliphatic polyamide (A-2), and the content of the aliphatic copolyamide (A-1) in the polyamide resin composition is 1% by mass to 30% by mass.

Effects of the Invention

In the present invention, there can be provided a polyamide resin composition which can exhibit a melt viscosity, mechanical physical properties, and heat welding properties such that excellent blow moldability can be achieved.

MODE FOR CARRYING OUT THE INVENTION

As used herein, with respect to the amount of the component contained in the composition, when a plurality of materials corresponding to the components are present in the composition, the amount of the components in the composition means the total amount of the materials present in the composition unless otherwise specified.

[Polyamide Resin Composition]

The polyamide resin composition according to the present embodiment comprises polyamide resin (A), which comprises aliphatic copolyamide (A-1) comprising three or more types of monomers and aliphatic polyamide (A-2), and impact-resistant material (B), wherein the content of aliphatic copolyamide (A-1) in the polyamide resin composition is 1% by mass to 30% by mass. By virtue of containing aliphatic copolyamide (A-1) comprising three or more types of monomers in a specific content in addition to aliphatic polyamide (A-2), the polyamide resin composition has excellent mechanical physical properties and excellent heat welding properties, so that excellent blow moldability can be exhibited.

Polyamide Resin (A)

The polyamide resin composition comprises, as polyamide resin (A), at least one aliphatic copolyamide (A-1) comprising three or more types of monomers and at least one aliphatic polyamide (A-2). The polyamide resin composition may further comprise, for example, aromatic polyamide (A-3) and the like, if necessary.

Aliphatic Copolyamide (A-1)

Aliphatic copolyamide (A-1) is a copolyamide resin obtained by copolymerizing three or more types of monomers. Aliphatic copolyamide (A-1) is a copolymer of three or more types of monomers selected from the group consisting of a combination of a diamine and a dicarboxylic acid, a lactam, and an aminocarboxylic acid. With respect to the combination of a diamine and a dicarboxylic acid, a combination of one type of diamine and one type of dicarboxylic acid is regarded as one type of monomer.

Examples of diamines include aliphatic diamines, such as ethylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, tridecanediamine, tetradecanediamine, pentadecanediamine, hexadecanediamine, heptadecanediamine, octadecanediamine, nonadecanediamine, eicosanediamine, 2-methyl-1,8-octanediamine, and 2,2,4/2,4,4-trimethylhexamethylenediamine; and alicyclic diamines, such as 1,3-/1,4-cyclohexyldiamine, bis(4-aminocyclohexyl)methane, bis(4-aminocyclohexyl)propane, bis(3-methyl-4-aminocyclohexyl)methane, (3-methyl-4-aminocyclohexyl)propane, 1,3-/1,4-bisaminomethylcyclohexane, 5-amino-2,2,4-trimethyl-1-cyclopentanemethylamine, 5-amino-1,3,3-trimethylcyclohexanemethylamine, bis(aminopropyl)piperazine, bis(aminoethyl)piperazine, and norbornanedimethyleneamine. Of these, from the viewpoint of the polymerization productivity, preferred are aliphatic diamines, and more preferred is hexamethylenediamine.

Examples of dicarboxylic acids include aliphatic dicarboxylic acids, such as oxalic acid, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, octadecanedioic acid, and eicosanedioic acid; and alicyclic dicarboxylic acids, such as 1,3-/1,4-cyclohexanedicarboxylic acid, dicyclohexanemethane-4,4'-dicarboxylic acid, and norbornanedicarboxylic acid. Of these, preferred are aliphatic dicarboxylic acids or alicyclic dicarboxylic acids, more preferred are aliphatic dicarboxylic acids, and further preferred is adipic acid.

Examples of lactams include β-caprolactam, enanthlactam, undecanelactam, dodecanelactam, α-pyrrolidone, and α-piperidone. Of these, from the viewpoint of the polymerization productivity, preferred is at least one member selected from the group consisting of ε-caprolactam, undecanelactam, and dodecanelactam.

Examples of aminocarboxylic acids include 6-aminocaproic acid, 7-aminoheptanoic acid, 9-aminononanoic acid, 11-aminoundecanoic acid, and 12-aminododecanoic acid. Of these, from the viewpoint of the polymerization productivity, preferred is at least one member selected from the group consisting of 6-aminocaproic acid, 11-aminoundecanoic acid, and 12-aminododecanoic acid.

Examples of apparatuses for producing aliphatic copolyamide (A-1) include known apparatuses for producing a polyamide, such as a batch reaction vessel, a single-chamber or multi-chamber continuous reaction apparatus, a tubular continuous reaction apparatus, and a kneading reaction extruder, e.g., a single-screw kneading extruder and a twin-screw kneading extruder. With respect to the polymerization method, using a known method, such as melt polymerization, solution polymerization, or solid phase polymerization, polymerization can be made by repeating operations under atmospheric pressure, under a reduced pressure, and under a pressure. These polymerization methods can be used individually or appropriately in combination.

Specific examples of aliphatic copolyamides (A-1) include caprolactam/hexamethylenediaminoadipic acid/lauryllactam (polyamide 6/66/12), caprolactam/hexamethylenediaminoadipic acid/hexamethylenediaminosebacic acid (polyamide 6/66/610), and caprolactana/hexamethylenediaminoadipic acid/hexamethylenediaminododecanedicarboxylic acid (polyamide 6/66/612). Of these, the aliphatic copolyamide is preferably polyamide 6/66/12 from the viewpoint of the mechanical physical properties and heat welding properties.

These aliphatic copolyamides (A-1) may be used individually or in combination.

The copolymerization ratio for the monomers in aliphatic copolyamide (A-1) can be appropriately selected according to, for example, the purpose. For example, when aliphatic copolyamide (A-1) is polyamide 6/66/12, the copolymerization ratio can be 20 to 98/1 to 40/1 to 40.

With respect to the relative viscosity of aliphatic copolyamide (A-1), there is no particular limitation. However, from the viewpoint of improving the effects of the present invention, it is preferred that the relative viscosity of aliphatic copolyamide (A-1) is 1.8 to 5.0, as measured at 25° C. with respect to 1 g of a polymer dissolved in 100 ml of 96% concentrated sulfuric acid in accordance with JIS K-6920.

From the viewpoint of the mechanical physical properties and heat welding properties, the content of aliphatic copolyamide (A-1) in the polyamide resin composition is 1% by mass to 30% by mass, preferably 2% by mass to 25% by mass, more preferably 5% by mass to 20% by mass. When the content of aliphatic copolyamide (A-1) in the polyamide resin composition is less than 1% by mass, the heat welding properties are likely to become poor. Further, when the content of aliphatic copolyamide (A-1) is more than 30% by mass or less, the mechanical physical properties are likely to become poor.

Aliphatic Polyamide (A-2)

Examples of aliphatic polyamides (A-2) include aliphatic polyamide resins comprising a diamine and a dicarboxylic acid, aliphatic polyamide resins comprising a lactam or an aminocarboxylic acid, and aliphatic copolyamide resins comprising a copolymer of these two types of monomers. Aliphatic polyamide (A-2) excludes copolyamide resins obtained by copolymerizing three or more types of monomers.

Examples of diamines include aliphatic diamines, such as ethylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, tridecanediamine, tetradecanediamine, pentadecanediamine, hexadecanediamine, heptadecanediamine, octadecanediamine, nonadecanediamine, eicosanediamine, 2-methyl-1,8-octanediamine, and 2,2,4/2,4,4-trimethylhexamethylenediamine; and alicyclic diamines, such as 1,3-/1,4-cyclohexyldiamine, bis(4-aminocyclohexyl)methane, bis (4-aminocyclohexyl)propane, bis(3-methyl-4-aminocyclohexyemethane, (3-methyl-4-aminocyclohexyl) propane, 1,3-/1,4-bisaminomethylcyclohexane, 5-amino-2,2,4-trimethyl-1-cyclopentanemethylamine, 5-amino-1,3,3-trimethylcyclohexanemethylamine, bis(aminopropyl) piperazine, bis(aminoethyl)piperazine, and norbornanedimethyleneamine. Of these, from the viewpoint of the polymerization productivity, preferred are aliphatic diamines, and more preferred is hexamethylenediamine.

Examples of dicarboxylic acids include aliphatic dicarboxylic acids, such as oxalic acid, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, octadecanedioic acid, and eicosanedioic acid; and alicyclic dicarboxylic acids, such as 1,3-/1,4-cyclohexanedicarboxylic acid, dicyclohexanemethane-4,4'-dicarboxylic acid, and norbornanedicarboxylic acid. Of these, from the viewpoint of the polymerization productivity, preferred are aliphatic dicarboxylic acids, and more preferred is adipic acid.

Examples of lactams include ε-caprolactam, enanthlactam, undecanelactam, dodecanelactam, α-pyrrolidone, and α-piperidone. Examples of aminocarboxylic acids include 6-aminocaproic acid, 7-aminoheptanoic acid, 9-aminononanoic acid, 11-aminoundecanoic acid, and 12-aminododecanoic acid. Of these, from the viewpoint of the polymerization productivity, preferred is ε-caprolactam or 6-aminocaproic acid, and more preferred is ε-caprolactam.

Examples of apparatuses for producing aliphatic polyamide (A-2) include known apparatuses for producing a polyamide, such as a batch reaction vessel, a single-chamber or multi-chamber continuous reaction apparatus, a tubular continuous reaction apparatus, and a kneading reaction extruder, e.g., a single-screw kneading extruder and a twin-screw kneading extruder. With respect to the polymerization method, using a known method, such as melt polymerization, solution polymerization, or solid phase polymerization, polymerization can be made by repeating operations under atmospheric pressure, under a reduced pressure, and under a pressure. These polymerization methods can be used individually or appropriately in combination.

Examples of homopolymers of aliphatic polyamide (A-2) include polycaprolactam (polyamide 6), polyenanthlactam (polyamide 7), polyundecanelactam (polyamide 11), polylauryllactam (polyamide 12), polyhexamethyleneadipamide (polyamide 66), polytetramethylenedodecamide (polyamide 412), polypentamethyleneazelamide (polyamide 59), polypentamethylenesebacamide (polyamide 510), polypentamethylenedodecamide (polyamide 512), polyhexamethyleneazelamide (polyamide 69), polyhexamethylenesebacamide (polyamide 610), polyhexamethylenedodecamide (polyamide 612), polynonamethyleneadipamide (polyamide 96), polynonamethyleneazelamide (polyamide 99), polynonamethylenesebacamide (polyamide 910), polynonamethylenedodecamide (polyamide 912), polydecamethyleneadipamide (polyamide 106), polydecamethyleneazelamide (polyamide 109), polydecamethylenedecamide (polyamide 1010), polydecamethylenedodecamide (polyamide 1012), polydodecamethyleneadipamide (polyamide 126), polydodecamethyleneazelamide (polyamide 129), polydodecamethylenesebacamide (polyamide 1210), polydodecamethylenedodecamide (polyamide 1212), and polyamide 122.

Examples of copolymers comprising two types of monomers of aliphatic polyamide (A-2) include a caprolactam/hexamethylenediaminoazelaic acid copolymer (polyamide 6/69), a caprolactam/hexamethylenediaminosebacic acid copolymer (polyamide 6/610), a caprolactam/hexamethylenediaminoundecanoic acid copolymer (polyamide 6/611), a caprolactam/hexamethylenediaminododecanoic acid copolymer (polyamide 6/612), a caprolactam/aminoundecanoic acid copolymer (polyamide 6/11), and a caprolactam/lauryllactam copolymer (polyamide 6/12).

These aliphatic polyamides (A-2) can be used individually or in combination.

Of these, from the viewpoint of the polymerization productivity, aliphatic polyamide (A-2) is preferably at least one member selected from the group consisting of polyamide 6, polyamide 66, polyamide 6/66, polyamide 6/12, polyamide 610, polyamide 612, polyamide 11, and polyamide 12, more preferably polyamide 6.

With respect to the relative viscosity of aliphatic polyamide (A-2), there is no particular limitation. However, from the viewpoint of further improving the effects of the present invention, it is preferred that the relative viscosity of aliphatic polyamide (A-2) is 1.8 to 5.0, as measured at 25° C. with respect to 1 g of a polymer dissolved in 100 ml of 96% concentrated sulfuric acid in accordance with HS K-6920.

With respect to aliphatic polyamide (A-2), from the viewpoint of the productivity, aliphatic polyamide (A-2H) having a relative viscosity of 3.5 or more and aliphatic polyamide (A-2L) having a relative viscosity of less than 3.5 are preferably used in combination. The relative viscosity of aliphatic polyamide (A-2H) is preferably 3.6 to 4.5, more preferably 3.9 to 4.2. The relative viscosity of aliphatic polyamide (A-2L) is preferably 3.0 to 3.5, more preferably 3.2 to 3.5. When aliphatic polyamides having different relative viscosities are used in combination, the ratio of aliphatic polyamide (A-2H) mixed to aliphatic polyamide (A-2L) is preferably 10% by mass to 90% by mass, more preferably 20% by mass to 80% by mass.

From the viewpoint of the mechanical physical properties and heat welding properties, the total content of aliphatic polyamide (A-2) in the polyamide resin composition is preferably 30% by mass to 95% by mass, more preferably 40% by mass to 80% by mass.

Aromatic Polyamide (A-3)

The polyamide resin may further comprise at least one aromatic polyamide (A-3). Aromatic polyamide (A-3) is an aromatic polyamide resin which comprises a diamine and a dicarboxylic acid, wherein at least one of the diamine and the dicarboxylic acid is an aromatic monomer component. Aromatic polyamide (A-3) preferably comprises an aliphatic dicarboxylic acid and an aromatic diamine, or an aromatic dicarboxylic acid and an aliphatic diamine, more preferably comprises an aromatic dicarboxylic acid and an aliphatic diamine. Aromatic polyamide (A-3) may be either a homopolymer or a copolymer comprising two types of monomers. With respect to the combination of a diamine and a dicarboxylic acid, a combination of one type of diamine and one type of dicarboxylic acid is regarded as one type of monomer.

As specific examples of diamines and dicarboxylic acids, there can be mentioned the diamines and dicarboxylic acids already described above in the items for aliphatic copolyamide (A-1) and aliphatic polyamide (A-2).

Examples of aromatic diamines include m-phenylenediamine, p-phenylenediamine, m-xylylenediamine, p-xylylenediamine, 1,4-bis(aminomethyl)naphthalene, 1,5-bis(aminomethypnaphthalene, 2,6-bis(aminomethyl)naphthalene, 2,7-bis(aminomethyl)naphthalene, 4,4'-diaminodiphenylmethane, 2,2-bis(4-aminophenyl)propane, 4,4'-diaminodiphenyl sulfone, and 4,4'-diaminodiphenyl ether.

Examples of aromatic dicarboxylic acids include terephthalic acid, isophthalic acid, 1,4-naphthalenedicarboxylic acid, 1,5-naphthalenedicarboxylic acid, 2,6-naphthalenedicarboxylic acid, 2,7-naphthalenedicarboxylic acid, 1,3-phenylenedioxydiacetic acid, 1,4-phenylenedioxydiacetic acid, 4,4'-oxydibenzoic acid, diphenylmethane-4,4'-dicarboxylic acid, diphenylethane-4,4'-dicarboxylic acid, diphenylpropane-4,4'-dicarboxylic acid, diphenyl ether-4,4'-dicarboxylic acid, diphenyl sulfone-4,4'-dicarboxylic acid, 4,4'-biphenyldicarboxylic acid, and 4,4'-triphenyldicarboxylic acid.

Specific examples of aromatic polyamides (A-3) include polynonanemethyleneterephthalamide (polyamide 9T), polyhexamethyleneterephthalamide (polyamide 6T), polyhexamethyleneisophthalamide (polyamide 6I), a polyhexamethyleneadipamide/polyhexamethyleneterephthalamide copolymer (polyamide 66/6T), a polyhexamethyleneterephthalamide/polycaproamide copolymer (polyamide 6T/6), a polyhexamethyleneadipamide/polyhexamethyleneisophthalamide copolymer (polyamide 66/6I), a polyhexamethyleneisophthalamide/polycaproamide copolymer (polyamide 6I/6), a polydodecamide/polyhexamethyleneterephthalamide copolymer (polyamide 12/6T), a polyhexamethyleneadipamide/polyhexamethyleneterephthalamide/polyhexamethylene isophthalamide copolymer (polyamide 66/6T/6I), a polyhexamethyleneadipamide/polycaproamide/polyhexamethyleneisophthalamide copolymer (polyamide 66/6/6I), a polyhexamethyleneterephthalamide/polyhexamethyleneisophthalamide copolymer (polyamide 6T/6I), a polyhexamethyleneterephthalamide/poly(2-methylpentamethyleneterephthalamide) copolymer (polyamide 6T/M5T), polyxylyleneadipamide (polyamide MXD6), and copolymers thereof.

These aromatic polyamides (A-3) can be used individually or in combination.

Preferred examples of aromatic polyamides (A-3) include noncrystalline, partially aromatic copolyamide resins comprising at least two aromatic monomer components. The noncrystalline, partially aromatic copolyamide resin is preferably a noncrystalline polyamide having a glass transition temperature of 100° C. or higher, as determined from a peak temperature for the loss modulus in an absolute dry state obtained by the measurement of a dynamic viscoelasticity.

The term "noncrystalline" means that the amount of heat of melting of a crystal measured by a differential scanning calorimeter (DSC) is 1 cal/g or less.

The noncrystalline, partially aromatic copolyamide resin is preferably one which comprises 40 to 95 mol % of terephthalic acid component units and 5 to 60 mol % of isophthalic acid component units, and an aliphatic diamine. Examples of preferred combinations include an equimolar salt of hexamethylenediamine and terephthalic acid and an equimolar salt of hexamethylenediamine and isophthalic acid, and, for example, preferred is a polyhexamethylene-terephthalamide/polyhexamethyleneisophthalamide copolymer (polyamide 6T/6I).

Further, preferred is an aromatic polyamide that is a copolymer which comprises 60% by mass to 99% by mass of a polyamide forming component comprising an aliphatic diamine and isophthalic acid and terephthalic acid, and 1% by mass to 40% by mass of an aliphatic polyamide component.

With respect to the relative viscosity of aromatic polyamide (A-3), there is no particular limitation, but the relative viscosity of the aromatic polyamide (A-3), as measured in a 0.5% m-cresol solution at 20° C. in accordance with ISO 307, is preferably 1.0 to 2.0, more preferably 1.2 to 1.8.

When the polyamide resin composition contains aromatic polyamide (A-3), from the viewpoint of exhibiting the effects of the present invention, the content of aromatic polyamide (A-3) in the polyamide resin composition is preferably 1% by mass to 30% by weight, more preferably 1% by mass to 20% by mass, further preferably 5% by mass to 15% by mass.

Impact-Resistant Material (B)

The polyamide resin composition comprises at least one impact-resistant material (B). Examples of impact-resistant materials include rubbery polymers. The impact-resistant material preferably has a flexural modulus of 500 MPa or less as measured in accordance with ASTM D-790.

Specific examples of impact-resistant materials (B) include (ethylene and/or propylene)/α-olefin copolymers and (ethylene and/or propylene)/(α,β-unsaturated carboxylic acid and/or unsaturated carboxylate) copolymers. These can be used individually or in combination. The impact-resistant material is preferably an ethylene/α-olefin copolymer.

The (ethylene and/or propylene)/α-olefin copolymer is a polymer obtained by copolymerizing ethylene and/or propylene and an α-olefin having 3 or more or 4 or more carbon atoms.

Examples of α-olefins having 3 or more carbon atoms include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, and 12-ethyl-1-tetradecene. These may be used individually or in combination.

The copolymer may be one which is obtained by copolymerizing a polyene, such as a non-conjugated diene. Examples of non-conjugated dienes include 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), dicyclopentadiene, cyclohexadiene, cyclooctadiene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene, and 2-propenyl-2,5-norbornadiene. These may be used individually or in combination.

The (ethylene and/or propylene)/(α,β-unsaturated carboxylic acid and/or unsaturated carboxylate) copolymer is a polymer obtained by copolymerizing ethylene and/or propylene and an α,β-unsaturated carboxylic acid and/or unsaturated carboxylate monomer. Examples of α,β-unsaturated carboxylic acid monomers include acrylic acid and methacrylic acid. Examples of α,β-unsaturated carboxylate monomers include methyl esters, ethyl esters, propyl esters, butyl esters, pentyl esters, hexyl esters, heptyl esters, octyl esters, nonyl esters, and decyl esters of the above unsaturated carboxylic acids. These may be used individually or in combination.

The (ethylene and/or propylene)/α-olefin copolymer and the (ethylene and/or propylene)/(α,β-unsaturated carboxylic acid and/or unsaturated carboxylate) copolymer, each of which is used as impact-resistant material (B), is preferably a polymer modified with a carboxylic acid and/or a derivative thereof. When modified with such a component, the impact-resistant material contains in the molecule thereof a functional group having an affinity with polyamide resin (A).

The amount of the carboxylic acid and/or derivative thereof added, based on the mass or total mass of the copolymer or copolymers, is preferably in the range of from 0.1% by mass to 10% by mass, more preferably in the range of from 0.5% by mass to 5.0% by mass. When the amount of the carboxylic acid and/or derivative thereof added is 0.1% by mass or more, the compatibility with the polyamide resin is likely to become more excellent, further improving the impact resistance. When the amount of the carboxylic acid and/or derivative thereof added is 10% by mass or less, it is likely that a satisfactory effect of improving the impact resistance is obtained, so that the productivity becomes more excellent.

Examples of functional groups having an affinity with polyamide resin (A) include a carboxyl group, an acid anhydride group, a carboxylate group, a carboxylic acid metal salt, a carboxylic acid imide group, a carboxylic acid amide group, and an epoxy group. Examples of compounds containing these functional groups include acrylic acid, methacrylic acid, maleic acid, fumaric acid, itaconic aicd, crotonic acid, mesaconic acid, citraconic acid, glutaconic acid, cis-4-cyclohexene-1,2-dicarboxylic acid, endobicyclo-[2.2.1]-5-heptene-2,3-dicarboxylic acid, and metal salts of these carboxylic acids, monomethyl maleate, monomethyl itaconate, methyl acrylate, ethyl acrylate, butyl acrylate, 2-ethylhexyl acrylate, hydroxyethyl acrylate, methyl methacrylate, 2-ethylhexyl methacrylate, hydroxyethyl methacrylate, aminoethyl methacrylate, dimethyl maleate, dimethyl itaconate, maleic anhydride, itaconic anhydride, citraconic anhydride, endobicyclo-[2.2.1]-5-heptene-2,3-dicarboxylic anhydride, maleimide, N-ethylmaleimide, N-butylmaleimide, N-phenylmaleimide, acrylamide, methacrylamide, glycidyl acrylate, glycidyl methacrylate, glycidyl ethacrylate, glycidyl itaconate, and glycidyl citraconate. These can be used individually or in combination. Of these, preferred is maleic anhydride.

Impact-resistant material (B) preferably has an MFR of 0.1 to 10.0 g/10 minutes, as measured at a temperature of 230° C. under a load of 2,160 g in accordance with ASTM D1238. When the MFR of impact-resistant material (B) is 0.1 g/10 minutes or more, it is likely that the melt viscosity of the polyamide resin composition is not too high and hence the form of the parison is prevented from being instable, so that a molded article having a further uniform thickness is obtained. Further, when the MFR of impact-resistant material (B) is 10.0 g/10 minutes or less, it is likely that the drawdown of the parison is not too large, so that excellent blow moldability can be obtained.

The content of impact-resistant material (B) in the polyamide resin composition is preferably 10% by mass to 30% by mass, more preferably 15% by mass to 25% by mass. When the content of impact-resistant material (B) is 10% by mass or more, the melt viscosity and impact resistance are likely to be improved satisfactorily. When the content of impact-resistant material (B) is 30% by mass or less, a lowering of inherent properties of the polyamide resin, such as a strength and a heat resistance, is suppressed.

(Additive)

According to, for example, the purpose, the polyamide resin composition may appropriately contain a functionality imparting agent, such as a dye, a pigment, a fibrous reinforcing material, a particulate reinforcing material, a plasticizer, an antioxidant, a foaming agent, a weathering agent, a crystal nucleating agent, a crystallization promoter, a release agent, a lubricant, an antistatic agent, a flame retardant, a flame retardant auxiliary, or a colorant. For improving the effects of the present invention, the polyamide resin composition preferably contains an antioxidant.

The antioxidant can be classified into a copper antioxidant (inorganic antioxidant) and an organic antioxidant according to the molecular structure, and any of them may be used.

(Copper Antioxidant)

From the viewpoint of the heat welding properties, the content of the copper antioxidant in the polyamide resin composition is preferably 5% by mass or less, more preferably 1% by mass or less, and the polyamide resin composition further preferably contains substantially no copper antioxidant. Containing substantially no copper antioxidant means that the presence of a copper antioxidant inevitably mixed into the polyamide resin composition is accepted.

The reason for the above-mentioned preferred content of the copper antioxidant in the polyamide resin composition is presumed that when the polyamide resin composition contains a copper antioxidant in a predetermined amount or more, the impact-resistant material is in contact with copper to suffer copper poisoning, so that the impact-resistant material deteriorates. This does not apply to the case using the copper antioxidant and an organic antioxidant in combination.

Specific examples of copper antioxidants include mixtures of a copper salt and a potassium halide. As an example of the copper salt in the mixture of a copper salt and a potassium halide, there can be mentioned copper iodide.

(Organic Antioxidant)

From the viewpoint of the heat welding properties and heat resistance properties, the polyamide resin composition preferably contains at least one organic antioxidant as a heat resistant material. Even when the time for interval upon blow molding is extended, the polyamide resin composition containing an organic antioxidant can further improve the heat welding properties while maintaining, for example, general heat aging properties, physical properties, and melt viscosity. The reason for this is presumed that, for example, the addition of an organic antioxidant suppresses gelation caused due to the heat deterioration of the impact-resistant material, so that the nucleating action is suppressed.

Examples of organic antioxidants include phenolic antioxidants, thioether antioxidants, and phosphorus antioxidants. The organic antioxidant is preferably at least one member selected from the group consisting of phenolic antioxidants and thioether antioxidants, more preferably at least one member selected from the group consisting of phenolic antioxidants. The content of the organic antioxidant in the polyamide resin composition is preferably 0.01% by mass to 5% by mass, more preferably 0.05% by mass to 2% by mass.

Specific examples of phenolic antioxidants include N,N'-hexamethylenebis(3,5-di-t-butyl-4-hydroxy-hydrocinnamamide (Irganonox 1098; manufactured by BASF Japan Ltd.), pentaerythrityl-tetrakis[3-(3,5-di-t-butyl-4-hydroxyphenyl)-propionate (Irganox 1010; manufactured by BASF Japan Ltd.), ethylenebis(oxyethylene)bis[3-(5-tert-butyl-4-hydroxy-m-tolyppropionate] (Irganox 245; manufactured by BASF Japan Ltd.), and 3,9-bis[2-[3-(3-tert-butyl-4-hydroxy-5-methylphenyl)propionyloxy]-1,1-dimethylethyl]-2,4,8,10-tetraoxaspiro[5.5]undecane (SUMILIZER GA-80; manufactured by Sumitomo Chemical Co., Ltd.), and preferred is at least one member selected from the group consisting of these phenolic antioxidants.

Specific examples of thioether antioxidants include distearyl-3,3-thiodipropionate (Irganox PS802; manufactured by BASF Japan Ltd.), pentaerythrityl tetrakis(3-laurylthiopropionate) (SUMILIZER TP-D; manufactured by Sumitomo Chemical Co., Ltd.), and didodecyl (3,3'-thiodipropionate) (Irganox PS800; manufactured by BASF Japan Ltd.), and preferred is at least one member selected from the group consisting of these thioether antioxidants.

Specific examples of phosphorus antioxidants include tris(2,4-di-t-butylphenyl) phosphite (Irgafos 168; manufactured by BASF Japan Ltd.), bis(2,6-di-t-butyl-4-methylphenyl)pentaerythritol diphosphite (ADEKASTAB PEP-36; manufactured by ADEKA Corporation), and a reaction product of a biphenyl comprised mainly of tetrakis(2,4-di-tert-butylphenoxy)-4,4-biphenyldiphosphine, phosphorus trichloride, and 2,4-di-tert-butylphenol (Hostanox P-EPQ P; manufactured by Clariant Japan K.K.), and preferred is at least one member selected from the group consisting of these phosphorus antioxidants.

These organic antioxidants may be used individually or in combination.

From the viewpoint of the heat welding properties, the polyamide resin composition preferably contains at least one phenolic antioxidant, more preferably contains at least one phenolic antioxidant and at least one thioether antioxidant.

The content of the phenolic antioxidant in the polyamide resin composition is preferably 0.01% by mass to 5% by mass, more preferably 0.05% by mass to 2% by mass.

The content of the thioether antioxidant in the polyamide resin composition is preferably 0.01% by mass to 5% by mass, more preferably 0.05% by mass to 2% by mass.

The polyamide resin composition of the present invention has a melt viscosity, mechanical physical properties, and heat welding properties such that excellent blow moldability can be achieved.

(Melt Viscosity)

With respect to the present polyamide resin composition, the melt viscosity is preferably 9,000 to 14,000 Pa·s, as measured at 270° C. and at a shear rate of 12.16 sec$^{-1}$ using a capillary flow tester.

With respect to the present polyamide resin composition, the melt viscosity is preferably 2,300 to 4,000 Pa·s, as measured at 270° C. and at a shear rate of 121.6 sec$^{-1}$ using a capillary flow tester.

With respect to the present polyamide resin composition, the melt viscosity is preferably 550 to 1,000 Pa·s, as measured at 270° C. and at a shear rate of 1,216 sec$^{-1}$ using a capillary flow tester.

The melt viscosity can be measured by the method descried below. Using Capilograph 1D type P-C, manufacture by Toyo Seiki Seisaku-Sho, Ltd., a melt viscosity is measured. A melt viscosity at a shear rate of 12.16 sec$^{-1}$, 121.6 sec$^{-1}$, or 1,216 sec$^{-1}$ is measured at a measurement temperature of 270° C. using an orifice having a hole diameter of 1 mm and a length of 20 mm.

(Mechanical Physical Properties)

With respect to the present polyamide resin composition, the tensile yield stress is preferably 40 MPa or more, as measured at 23° C. in accordance with ISO 527-1,2.

With respect to the present polyamide resin composition, the nominal tensile strain at break is preferably 100% or more, as measured at 23° C. in accordance with ISO 527-1,2.

With respect to the present polyamide resin composition, the tensile modulus is preferably 1.3 to 2.0 GPa, as measured at 23° C. in accordance with ISO 527-1,2.

With respect to the present polyamide resin composition, the Charpy impact strength is preferably 130 to 150 kJ/m$^2$, as measured at 23° C. in accordance with ISO 179-1.

With respect to the present polyamide resin composition, the Charpy impact strength is preferably 38 to 60 kJ/m$^2$, as measured at −40° C. in accordance with ISO 179-1.

The tensile yield stress, nominal tensile strain at break, and tensile modulus can be measured by the method described below. An ISO standard TYPE-A or TYPE-B test specimen is prepared by injection molding and used in obtaining data for the mechanical physical properties. A tensile yield stress, a nominal tensile strain at break, and a tensile modulus are measured at 23° C. using a tensile tester Model 5567, manufactured by Instron Corporation, in accordance with ISO 527-1,2.

The Charpy impact strength can be measured by the method described below. In accordance with ISO 179-1, an edgewise impact test is conducted at 23° C. or −40° C. using an A-notched test specimen having a thickness of 4 mm and using Charpy impact tester No. 258-PC, manufactured by Yasuda Seiki Seisakusho, Ltd. (n=10).

(Heat Welding Properties)

With respect to the polyamide resin composition of the present invention, a test specimen which has been subjected to heat welding under the conditions shown below preferably has a tensile yield stress of 20 MPa or more at each of times for interval of 2, 6, 10, and 13 sec. With respect to the present polyamide resin composition, a test specimen which has been subjected to heat welding under the conditions shown below preferably has a nominal tensile strain at break of 20% or more at each of times for interval of 2, 6, and 10 sec.

An ISO Type-A (cut into 80 mm) is prepared as a test specimen, and, using a contact-type hot plate welding tester, heat welding of the test specimens is conducted under the conditions shown below.

Hot plate temperature: 300° C.
Contact time: 120 sec
Indentation 2 mm (the molten resin is extruded 5 to 6 mm under a pressure)

The test specimens are removed away from the hot plate, and, after a predetermined period of time (time for interval) has lapsed, the test specimens are bonded together at a contact pressure of 3.5 MPa for a cooling pressurizing time of 15 sec. The times for interval employed in the bonding are 2, 6, 10, and 13 sec.

With respect to the bonded test specimens, evaluation of a tensile test is performed to measure a tensile yield stress and a nominal tensile strain at break. The chuck-to-chuck distance is 95 mm, and the test rate is 50 mm/min.

(Solidification Properties)

With respect to the polyamide resin composition of the present invention, the crystallization temperature (Tc) is preferably 130° C. or lower, as measured after being maintained at 300° C. for 10 minutes and then cooled at a cooling rate of 200° C./min. The crystallization temperature (Tc) can be measured by a differential scanning calorimetry apparatus.

(Heat Resistance Properties)

With respect to the polyamide resin composition of the present invention, a test specimen of an ISO Type C is prepared, and subjected to heat treatment by maintaining it in a drying oven at 150° C. for 500 hr, and then tensile properties are measured, and the determined maintaining ratio of the nominal tensile strain at break to the tensile properties before the heat treatment is preferably 30% or more.

With respect to the method for producing the polyamide resin composition, there is no particular limitation, and, for example, the following method can be applied.

When mixing polyamide resin (A), which comprises aliphatic copolyamide (A-1) and aliphatic polyamide (A-2) and optionally aromatic polyamide (A-3), and impact-resistant material (B) and optionally an antioxidant with each other, a generally known melt-kneading machine, such as a single-screw or twin-screw extruder, a Banbury mixer, a kneader, or a mixing roll, is used. For example, there are methods using a twin-screw extruder, such as a method in which all the raw materials are incorporated and then melt-kneaded, a method in which part of the raw materials are incorporated and then melt-kneaded, and the remaining raw materials are further incorporated thereinto and the resultant mixture is melt-kneaded, and a method in which part of the raw materials are incorporated and then melt-knead and, using a side feeder, the remaining raw materials are mixed into the resultant mixture being melt-knead, and any of these methods may be employed.

The polyamide resin composition of the present invention can exhibit a melt viscosity, mechanical physical properties, and heat welding properties such that excellent blow moldability can be achieved, and therefore can be advantageously used in producing a molded article by blow molding.

With respect to the method for producing a molded article from the polyamide resin by blow molding, there is no particular limitation, and a known method can be used. Generally, using a general blow molding machine, a parison may be formed and then subjected to blow molding. A preferred resin temperature upon forming a parison is in the range of the temperature higher by from 10° C. to 70° C. than the melting point of the polyamide resin composition.

Further, the polyamide resin composition can be co-extruded, together with a polyolefin, such as polyethylene, or another thermoplastic resin, and then subjected to blow molding to obtain a multilayer structure. In this case, a bonding layer can be formed between the polyamide resin composition layer and the layer of another thermoplastic resin, such as a polyolefin. In the case of a multilayer structure, the polyamide resin composition of the present invention can be used in any of an outer layer and an inner layer.

EXAMPLES

Hereinbelow, the present invention will be described in more detail with reference to the following Examples and Comparative Examples, which should not be construed as limiting the scope of the present invention. The methods for evaluating the physical properties of the resins and molded articles used in the following Examples and Comparative Examples are described below.

(Melt Properties)

Using Capilograph 1D type P-C, manufacture by Toyo Seiki Seisaku-Sho, Ltd., a melt viscosity was measured. A melt viscosity at a shear rate of 12.16 $sec^{-1}$, 121.6 $sec^{-1}$, or 1,216 $sec^{-1}$ was measured at a measurement temperature of 270° C. using an orifice having a hole diameter of 1 mm and a length of 20 mm.

(Mechanical Physical Properties)

An ISO standard TYPE-A or TYPE-B test specimen was prepared by injection molding and used in obtaining data for the mechanical physical properties. A tensile yield stress, a nominal tensile strain at break, and a tensile modulus were measured at 23° C. using a tensile tester Model 5567, manufactured by Instron Corporation, in accordance with ISO 527-1,2.

With respect to the Charpy impact strength, in accordance with ISO 179-1, an edgewise impact test was conducted at 23° C. or −40° C. using an A-notched test specimen having a thickness of 4 mm and using Charpy impact tester No. 258-PC, manufactured by Yasuda Seiki Seisakusho, Ltd. (n=10).

(Welding Properties)

An ISO Type-A (cut into 80 mm) was prepared as a test specimen, and, using a contact-type hot plate welding tester, heat welding of the test specimens was conducted under the conditions shown below.

Hot plate temperature: 300° C.
Contact time: 120 sec
Indentation 2 min (the molten resin was extruded 5 to 6 mm under a pressure)

The test specimens were removed away from the hot plate, and, after a predetermined period of time (time for interval) had lapsed, the test specimens were bonded together at a contact pressure of 3.5 MPa for a cooling pressurizing time of 15 sec. The times for interval employed in the bonding were 2, 6, 10, and 13 sec.

With respect to the bonded test specimens, evaluation of a tensile test was performed to measure a tensile yield stress and a nominal tensile strain at break. The chuck-to-chuck distance was 95 mm, and the test rate was 50 mm/min.

(Solidification Properties)

Using a differential scanning calorimetry apparatus (DSC-6220, manufactured by SEIKO Instruments Inc.), a sample was maintained at 300° C. for 10 minutes, and then cooled at a predetermined cooling rate to measure a crystallization temperature (Tc). The cooling rates employed were 20° C./min, 50° C./min, and 200° C./min.

(Heat Resistance Properties)

A test specimen of an ISO Type C was prepared, and subjected to heat treatment by maintaining it in a drying oven at 150° C. for a predetermined time, and then tensile properties were measured, and the maintaining ratio of the nominal tensile strain at break to the tensile properties before the heat treatment was determined. The heat treatment times were 50 hr, 100 hr, 300 hr, and 500 hr.

Polyamide Resin
Aliphatic Copolyamide:
PA6/66/12: 6434B; manufactured by Ube Industries, Ltd.
PA6/66: 5034X14; manufactured by Ube Industries, Ltd.
Aliphatic Polyamide
PA6-1: 1030B; manufactured by Ube Industries, Ltd. (relative viscosity: 4.08)
PA6-2: 1022B; manufactured by Ube Industries, Ltd. (relative viscosity: 3.37)
Aromatic Polyamide
PA6T/6I: Grivory G21; manufactured by EMS-CHEMIE (Japan) Ltd.
Impact-resistant material
Acid-modified ethylene-α-olefin copolymer: MH7020; manufactured by Mitsui Chemicals, Inc.
Antioxidant
CuI, KI Mixture; Copper antioxidant which is obtained by mixing 0.03% by mass of CuI and 0.22% by mass of KI into a resin composition.
CuI, manufactured by Ise Chemicals Corporation; KI, manufactured by Mitsui Fine Chemicals, Inc.
Irgafos 168; phosphorus antioxidant; manufactured by BASF Japan Ltd.
Irganox 245; phenolic antioxidant; manufactured by BASF Japan Ltd.
Irganox 1098; phenolic antioxidant; manufactured by BASF Japan Ltd.
Sumilizer GA-80; phenolic antioxidant; manufactured by Sumitomo Chemical Co., Ltd.
Sumilizer TP-D; thioether antioxidant; manufactured by Sumitomo Chemical Co., Ltd.
Irganox PS802; thioether antioxidant; manufactured by BASF Japan Ltd.

The polyamide resin, impact-resistant material, and antioxidant shown in Table 1 were melt-kneaded using TEX44HCT twin-screw kneader having a cylinder diameter of 44 mm and having an L/D of 35 at a screw revolution speed of 170 rpm and at a discharge rate of 50 kg/hrs to prepare intended polyamide resin composition pellets. The figures for the formulation shown in the table are indicated in a unit of part(s) by mass, and symbol "−" means that the component is not incorporated.

The obtained pellets were used in the evaluation of the above-mentioned various physical properties. The obtained results are shown in Table 1.

TABLE 1

| | | | Comparative Example 1 | Comparative Example 2 | Comparative Example 3 | Example 1 | Example 2 | Example 3 | Example 4 | Example 5 | Example 6 | Example 7 | Example 8 | Example 9 |
|---|---|---|---|---|---|---|---|---|---|---|---|---|---|---|
| Formulation | Aliphatic polyamide | PA6-1 | 40.00 | 36.00 | 33.50 | 33.50 | 33.13 | 33.13 | 33.13 | 33.13 | 33.00 | 33.13 | 30.63 | 25.63 |
| | | PA6-2 | 40.00 | 36.00 | 33.50 | 33.50 | 33.12 | 33.12 | 33.12 | 33.12 | 33.00 | 33.12 | 30.62 | 25.62 |
| | Impact-resistant material | MH7020 | 20.00 | 20.00 | 20.00 | 20.00 | 20.00 | 20.00 | 20.00 | 20.00 | 20.00 | 20.00 | 20.00 | 20.00 |
| | Aromatic polyamide | CoPA6T/6I | — | 8.00 | 8.00 | 8.00 | 8.00 | 8.00 | 8.00 | 8.00 | 8.00 | 8.00 | 8.00 | 8.00 |
| | Aliphatic copolyamide | CoPA6/66 | — | — | 5.00 | — | — | — | — | — | — | — | — | — |
| | | CoPA6/66/12 | — | — | — | 5.00 | — | 5.00 | 5.00 | 5.00 | 5.00 | 5.00 | 10.00 | 20.00 |
| | Copper | CuI, KI Mixture | — | — | — | — | — | — | — | — | 0.25 | 0.25 | 0.25 | 0.25 |
| | Phosphorus antioxidant | Irgafos 168 | — | — | — | — | 0.25 | — | — | — | — | — | — | — |
| | Phenolic antioxidant | Irganox 245 | — | — | — | — | 0.50 | — | — | — | — | — | — | — |
| | | Irganox 1098 | — | — | — | 0.50 | — | — | — | — | — | — | — | — |
| | | Sumilizer GA-80 | — | — | — | — | — | — | 0.50 | — | 0.50 | 0.50 | — | — |
| | Thioether antioxidant | Sumilizer TP-D | — | — | — | — | — | 0.25 | 0.25 | 0.25 | 0.25 | — | — | 20.00 |
| | | Irganox PS802 | — | — | — | — | — | — | — | — | — | — | 0.50 | 0.50 |
| Melt viscosity | Capilograph 270° C. Orifice ø 1.0 mm × L 20.0 mm [Pa · s] | 12.16 sec⁻¹ | 5143 | 8229 | 9258 | 10160 | 11140 | 10390 | 10810 | 10880 | 10360 | 10440 | 13980 | 13810 |
| | | 121.6 sec⁻¹ | 1989 | 2234 | 2449 | 2753 | 2931 | 2747 | 2856 | 2827 | 2734 | 2850 | 3433 | 3707 |
| | | 1216 sec⁻¹ | 478 | 544 | 581 | 620 | 600 | 641 | 628 | 535 | 629 | 640 | 799 | 981 |
| Mechanical properties | Tensile yield stress [MPa] | ISO527-1,2 [23° C.] | 53 | 52 | 51 | 49 | 50 | 51 | 50 | 50 | 51 | 51 | 48 | 46 |
| | Nominal tensile strain at break [%] | ISO527-1,2 [23° C.] | 37 | 90 | 147 | 158 | 149 | 156 | 145 | 139 | 141 | 150 | 148 | 139 |
| | Tonga modulus [GPa] | ISO527-1,2 [23° C.] | 1.8 | 1.8 | 1.8 | 1.7 | 1.8 | 1.7 | 1.8 | 1.8 | 1.8 | 1.7 | 1.7 | 1.5 |
| | Charpy impact strength [kJ/m2] | ISO179-1 | 93 | 136 | 142 | 135 | 148 | 145 | 145 | 145 | 142 | 148 | 140 | 146 |
| | | ISO179-1 [−40° C.] | 28 | 37 | 41 | 42 | 48 | 40 | 39 | 40 | 38 | 43 | 60 | 46 |
| Welding properties | Tensile yield stress of hot-plate welded specimen [MPa] | 2 sec | 49 | 48 | 47 | 45 | 46 | 47 | 47 | 47 | 48 | 47 | 45 | 43 |
| | | 6 sec | 45 | 49 | 47 | 46 | 46 | 47 | 46 | 45 | 48 | 47 | 45 | 43 |
| | | 10 sec | 19 | 32 | 29 | 45 | 46 | 47 | 30 | 33 | 32 | 47 | 45 | 43 |
| | | 13 sec | 12 | 12 | 13 | 36 | 46 | 46 | 30 | 24 | 22 | 46 | 44 | 43 |
| | Nominal tensile strain at break of hot-plate welded specimen [%] | 2 sec | 50 | 125 | 126 | 116 | 109 | 126 | 125 | 131 | 126 | 125 | 120 | 130 |
| | | 6 sec | 35 | 102 | 88 | 113 | 127 | 125 | 118 | 64 | 120 | 115 | 114 | 121 |
| | | 10 sec | 1 | 6 | 2 | 57 | 116 | 123 | 30 | 31 | 1 | 20 | 98 | 111 |
| | | 13 sec | 1 | 3 | 2 | 3 | 112 | 83 | 2 | 4 | 1 | 10 | 84 | 77 |
| Solidification properties | Crystallization temperature (° C.) | 20° C./min | 181 | 175 | 173 | 172 | 174 | 176 | 175 | 176 | 175 | 174 | 170 | 168 |
| | | 50° C./min | 176 | 173 | 168 | 167 | 165 | 167 | 168 | 167 | 166 | 165 | 161 | 159 |
| | | 200° C./min | 145 | 142 | 136 | 132 | 123 | 129 | 130 | 130 | 129 | 130 | 126 | 124 |
| Heat resistance properties | Maintaining ratio of nominal tensile strain at break (%) | 50 hrs | 75 | 69 | 68 | 70 | 88 | 88 | 96 | 78 | 74 | 88 | 90 | 89 |
| | | 100 hrs | 61 | 52 | 54 | 55 | 72 | 79 | 89 | 69 | 74 | 66 | 88 | 85 |
| | | 300 hrs | 16 | 11 | 10 | 10 | 61 | 80 | 71 | 51 | 63 | 75 | 75 | 73 |
| | | 500 hrs | 5 | 3 | 3 | 3 | 14 | 75 | 56 | 36 | 62 | 50 | 40 | 33 |

From the above results, it is apparent that when the polyamide resin composition comprising an aliphatic polyamide and an impact-resistant material contains an aliphatic copolyamide comprising three or more types of monomers in a predetermined content, excellent welding properties and an improved melt viscosity can be obtained without largely lowering the mechanical physical properties (especially the nominal tensile strain at break and Charpy impact strength), so that excellent blow moldability can be achieved. Particularly, even when the time for interval is prolonged (or the welding takes time), excellent welding properties are exhibited. Further, it is apparent that, by adding an antioxidant to the polyamide resin composition, the welding properties are further improved.

INDUSTRIAL APPLICABILITY

The polyamide resin composition of the present invention can achieve both excellent mechanical physical properties and excellent heat welding properties in blow molding, and therefore can be advantageously used as a blow molding material.

The disclosure of Japanese Patent Application No. 2016-019682 (filing date: Feb. 4, 2016) is herein incorporated by reference in its entirety.

All the reference documents, patent applications, and technical standards described in the present specification are herein incorporated by reference to the same extent as that in the case where each of the reference documents, patent applications, and technical standards is specifically and individually shown to be incorporated by reference to each of them.

The invention claimed is:

1. A polyamide resin composition comprising a polyamide resin (A) and an impact-resistant material (B), wherein
   the polyamide resin (A) comprises an aliphatic copolyamide (A-1) comprising three or more types of monomers and an aliphatic polyamide (A-2),
   the content of the aliphatic copolyamide (A-1) in the polyamide resin composition is 1% by mass to 30% by mass, and
   the polyamide resin composition further comprises an aromatic polyamide (A-3), wherein the content of the aromatic polyamide (A-3) in the polyamide resin composition is 1% by mass to 30% by mass, and the aromatic polyamide (A-3) is a polyamide 6T/6I.

2. The polyamide resin composition according to claim 1, which has a copper antioxidant content of 1% by mass or less.

3. The polyamide resin composition according to claim 1, which contains an organic antioxidant.

4. The polyamide resin composition according to claim 3, wherein the content of the organic antioxidant in the polyamide resin composition is 0.05% by mass to 2% by mass.

5. The polyamide resin composition according to claim 3, wherein the organic antioxidant is a phenolic antioxidant.

6. The composition according to claim 1, wherein the aliphatic polyamide (A-2) comprises at least one member selected from the group consisting of polyamide 6, polyamide 66, polyamide 6/66, polyamide 6/12, polyamide 610, polyamide 612, polyamide 11, and polyamide 12.

7. A molded article comprising the polyamide resin composition according to claim 1.

8. The polyamide resin composition according to claim 2, which contains an organic antioxidant.

9. The polyamide resin composition according to claim 8, wherein the content of the organic antioxidant in the polyamide resin composition is 0.05% by mass to 2% by mass.

10. The polyamide resin composition according to claim 9, wherein the organic antioxidant is a phenolic antioxidant.

11. The composition according to claim 2, wherein the aliphatic polyamide (A-2) comprises at least one member selected from the group consisting of polyamide 6, polyamide 66, polyamide 6/66, polyamide 6/12, polyamide 610, polyamide 612, polyamide 11, and polyamide 12.

12. A molded article comprising the polyamide resin composition according to claim 2.

13. A molded article comprising the polyamide resin composition according to claim 3.

14. A molded article comprising the polyamide resin composition according to claim 8.

* * * * *